G. H. ROBICHON.
DIARY.
APPLICATION FILED APR. 3, 1918.

1,378,560.

Patented May 17, 1921.
3 SHEETS—SHEET 1.

Fig-1.

INVENTOR
GEORGES. H. ROBICHON

BY
E. H. Bond
ATTY

G. H. ROBICHON.
DIARY.
APPLICATION FILED APR. 3, 1918.

1,378,560.

Patented May 17, 1921.
3 SHEETS—SHEET 2.

FIG-2.

INVENTOR
GEORGES H. ROBICHON
BY
E. H. Bond
ATTY

G. H. ROBICHON.
DIARY.
APPLICATION FILED APR. 3, 1918.

1,378,560.

Patented May 17, 1921.
3 SHEETS—SHEET 3.

Fig. 9.

WITNESSES

INVENTOR
GEORGES H. ROBICHON.
BY
E.H.Bond
ATTY.

UNITED STATES PATENT OFFICE.

GEORGES HENRI ROBICHON, OF THREE RIVERS, QUEBEC, CANADA.

DIARY.

1,378,560.  Specification of Letters Patent.  Patented May 17, 1921.

Application filed April 3, 1918. Serial No. 226,541.

*To all whom it may concern:*

Be it known that I, GEORGES HENRI ROBICHON, a subject of the King of Great Britain, and resident of the city of Three Rivers, in the Province of Quebec, Dominion of Canada, have invented certain new and useful Improvements in Diaries, of which the following is a specification.

This invention relates to improvements in diaries, record sheets, or books, and it consists essentially of the improved arrangement hereinafter described in detail in the accompanying drawings and specification.

In the drawings have been shown the preferred forms of the invention, it being however understood that no limitation is necessarily made to the precise structural details herein exhibited, but the right is hereby reserved to any changes, alterations or modifications that come within the scope of the appended claim without departing from the spirit of the invention or sacrificing the efficiency of the same.

Figure 1 is a plan view illustrating an embodiment of my invention.

Fig. 2 is a similar view of a slightly modified form thereof.

Fig. 3 is a plan view of an alternative form of the invention.

Referring to Fig. 1, it will be seen that the sheet is ruled into vertical columns and these divided to form horizontal rows of spaces and each sheet has at one edge an indicating mark, as, for example, a numeral, which, in this instance, is placed upon a tab $a$, any desired number of these sheets being designed to be superimposed, one upon the other; as shown, 1, 18 and 31 designating the numbers of some of such superimposed sheets, and loosely held together as in a book or binder. A vertical column $c$ is sub-divided into thirteen subcolumns, the one at the left designated "Hours" and each of the others corresponding to one month of the year and conveniently having the name of the month, or abbreviation thereof, at the head thereof; the subcolumns corresponding to the months of the year are each also subdivided into two subcolumns each corresponding to one year and conveniently having the indication of the year at the head thereof; it is of course understood that more than two of these subcolumns may be made representing as many years as may be needed; that each of the horizontal rows of spaces is subdivided into nine subhorizontal rows of spaces, indicating the working hours of the day, which subhorizontal rows of spaces are preceded by a narrow vertical column designating these subhorizontal rows of spaces such as 9, 10 and 11, 12, 1, 2, 3, 4, 5, as seen in Fig. 1; of course more or less than nine subhorizontal rows of spaces may be made if so desired.

Additional information with respect to the names of the parties to a suit for instance, or any desired articles or titles of such suits is provided in the vertical column. Adjacent to the vertical column reserved for the names, and preceding these aforesaid vertical columns there are provided other vertical columns, one designating the numbers of the horizontal rows of spaces, one for checking off the names, articles, or titles when the matter referring to same has been closed and terminated, and one to put the pages into the binder, all as clearly shown in Figs. 1, 2 and 3.

At the extreme right hand of the page there is provided a "Remarks" column $b$, which is to be used for placing any memoranda.

There are twenty-six leaves when bound in a book each bearing a tab, each with a number on each side and the odd numerals appearing on one side of the tabs are ranged from one to twenty-five, whereas the opposite faces of the tabs are provided with even numerals from two to twenty-six inclusive. While the book herein described is shown containing twenty-six pages, it is, of course, to be understood that any number of pages, may be used as required, counting preferably the odd numerals on one side of the tabs and even numerals on the other, the odd numbers only being illustrated in the drawing.

At the left hand side of the page there is ruled one vertical broad column $d$ for including the names, articles or titles to be classified; one vertical narrow column $e$ in which appears the numbers designating the numbers of the horizontal rows of spaces; one vertical narrow column $f$ for the purpose of checking off the names, articles or titles when the matter referring to the same has been closed and terminated; and one broad vertical column $g$ for keeping the page within the binder. I also provide a record column $h$ intermediate the columns $d$ and $e$. In the column $d$ may be placed some indicating mark as "Title," and in the column $h$ the words "Record information" or other desired title and in the column $e$ the designation "Nos."

In practice the procedure is substantially as follows:—

Assuming that the Morris vs. Baker matter should come upon the 1st of January 1918 at 10 oclock in the morning, the indication will be put where the cross appears in the drawing.

It will be seen by Fig. 2 of the drawings that the vertical column $i$ is subdivided into twelve sub-columns $j$, each corresponding to one month of the year, and conveniently having the name of the month or abbreviation thereof at the head thereof; that the sub-columns corresponding to the month of the year are each also subdivided into sub-columns $k$, each corresponding to a certain part of the day, and conveniently having the indication of that particular part of the day at the head thereof.

$l$ is a vertical column to the left of the vertical columns $j$ sub-divided into spaces $n$ corresponding with the horizontal sub-divisions of the columns at the right thereof, as seen in Fig. 2, these sub-divisions being designed to receive proper indicating matter, such as "Ass. due" and "Renewal" and above the same is a space $m$ in which appears the word "Matters."

In a vertical column $o$ adjacent to the vertical designating sub-column $l$, is reserved a space for the names, articles or titles and additional information with respect thereto, and preceding this aforesaid vertical column, there are provided other vertical columns, one $p$ designating the number of the horizontal row, one $q$ for the purpose of checking off the names, articles or titles, when the matter referring to same has been closed and terminated, and one $v$ to put the pages into the binder.

At the extreme right of the page there is provided a "Remarks" column $s$ which is to be used for the same purpose as explained above in reference to Fig. 1 of the drawings.

It will be understood that the book may be made up of any desired number of pages, such as hereinbefore described, or the pages may be used singly, as preferred. The tabs above referred to have the one side provided with odd numerals 1 to 25 while the opposite sides of the tabs are designed to bear the even numerals from 2 to 26, inclusive.

Everything previously said with reference to the tabs; to the number of sub-vertical and sub-horizontal rows of spaces; to the title, record information and remarks spaces; to the omission or to the kind of the division, sub-division or sub-classification means; to the direction of the sub-divisions or sub-classifications; to the page referring to one month or one year of any division of time; to the permanent or temporary indications, in Fig. 1 of the drawings, will apply to the page shown in Fig. 2.

Assuming that an insurance company wishes to indicate that on the first of February at 12 o'clock noon, the insurance of Mr. A. B. shall become due, the user will in the column of February put number "12" at the place where it is shown in Fig. 2; then if the said company wishes to indicate that on the 1st of January, at 12 o'clock noon, Mr. A. B. should be notified to that effect, the user will put number "12" at the place where it is shown in Fig. 2 under the column of January.

It will be obvious that what is mentioned regarding Fig. 2 may be used in conjunction with what is mentioned regarding Figs. 3 or 2, that what is mentioned regarding Fig. 3 may be used in conjunction with what is mentioned regarding Fig. 2, and vice-versa.

When succeeding pages are used with the same name in any of the forms illustrated, it is obvious that it is not necessary to repeat the names, reference being had by the number designating the row in which is written the name, or by taking off that portion of the page following the name column.

Fig. 3 of the drawings illustrates a variation of the invention shown in Fig. 1, and is characterized by the fact that the headings at the top of the vertical columns are repeated a number of times. I have shown the headings repeated three times, at the top, middle and bottom of the page, while perforating lines 20 and 21 extend transversely across these to enable the various parts to be separated if desired. In this form of the invention I also repeat the vertical columns $d^a$, $e^a$, $f^a$ and $h^a$, as many times as desired. As shown I have illustrated these columns $d$, $e$, $f$ and $h$ as at the right hand side of the page, as well as on the left, and it may be noted that these columns, as used on the right hand side of a page, may be used to index succeeding sheets by folding the said right hand column over, so that it will lie flatly against the back of the sheet; the columns $d$, $e$, $f$ and $h$, then form indexes for the ruling on the back of the sheet and on the succeeding sheets.

As many sheets as desired are provided, each sheet being provided with the usual tab $a$. I have shown the tabs in this form of the invention marked with general reference letters A, B, C, D, etc., but it is optional that any well known form of the invention may be used.

As many changes and many other apparently widely different forms could be made in the construction of the invention, besides what is aforesaid, within the scope of the claim and without departing from the spirit of same, it is here intended that all matters contained in the accompanying specification and drawings shall be interpreted as illustrative and not in a limiting sense.

What I claim as my invention is:—

A diary comprising sheets, each ruled to provide vertical columns, each of which is provided with month designations, each of said month columns being ruled to provide two sub-columns provided with calendar designations other than months, the sheet being further ruled to provide two columns at one side of and adjacent the first-mentioned columns and a number column adjacent one of said two columns, horizontal lines intersecting all of the columns forming horizontal rows, subject matters designations being provided for said last-mentioned columns all of said designations being disposed at the top of the sheet.

In witness whereof, I have hereunto set my hand in the presence of a witness.

GEORGES HENRI ROBICHON.

Witness:
RUSSEL B. SMART.